Figure 1:
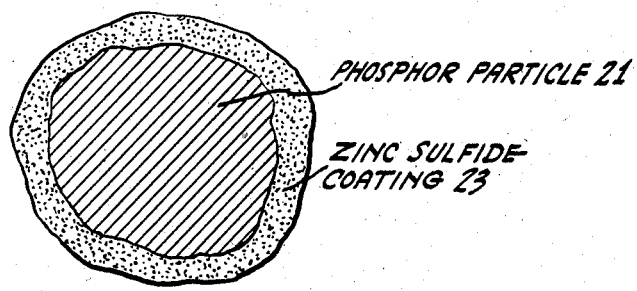

Oct. 13, 1959             S. A. HARPER             2,908,588
ZINC SULFIDE-COATED PHOSPHOR PARTICLES, PHOSPHOR
SCREEN, AND METHOD OF MAKING SCREEN
Filed March 15, 1957

INVENTOR.
STANLEY A. HARPER
BY
ATTORNEY

United States Patent Office 2,908,588
Patented Oct. 13, 1959

2,908,588

ZINC SULFIDE-COATED PHOSPHOR PARTICLES, PHOSPHOR SCREEN, AND METHOD OF MAKING SCREEN

Stanley A. Harper, East Petersburg, Pa., assignor to Radio Corporation of America, a corporation of Delaware Application March 15, 1957, Serial No. 646,490

7 Claims. (Cl. 117—33.5)

This invention relates to improved luminescent materials, to improved devices including said materials, and to improved methods for preparing and using said materials. The invention relates particularly, but not necessarily exclusively, to improved coatings for phosphor particles which may be used for making luminescent viewing screens for cathode ray tubes.

Luminescent screens, especially viewing screens for cathode ray tubes, are commonly prepared by adhering a layer of phosphor particles to a substrate with a binder and then baking the substrate and the layer in air to remove the binder. This latter step is commonly referred to as "bake-out." The luminescence properties of most phosphors deteriorate to some tolerable, although undesirable extent, during air bake-out. Some phosphors deteriorate to a serious and intolerable degree during air bake-out so that they are no longer useful as a practical matter. This is particularly true with phosphors whose body color becomes dark on processing. For example, the body color of copper-activated zinc selenide changes from yellow to dark red during bake-out in air due to the formation of free selenium by decomposition of the phosphor. The proportion of the phosphor crystal which is decomposed may be very small. However, the dark body color absorbs visible radiation very effectively and therefore reduces the luminescent efficiency markedly. Silver-activated zinc-cadmium sulfide is another phosphor whose body color darkens readily during bake-out in air. In this case, the dark color is believed to be due to the formation of cadmium oxide.

Generally, it may be stated that phosphors containing one or more of cadmium, selenium and tellurium are particularly sensitive to bake-out. The body color of each of these phosphors usually darkens to a smaller but still intolerable degree during bake-out in air when no organic binders are present. Special precautions taken during bake-out to prevent breakdown of these phosphors usually modify the processing technique. These precautions are expensive in time, effort, and capital, and are usually only partially effective.

An object of this invention is to provide improved luminescent materials which are resistant to thermal and chemical action during bake-out.

Another object is to provide improved zinc selenide phosphors which resist deterioration of the luminescence properties thereof during bake-out.

A further object is to provide improved processes for preparing the improved luminescent materials herein.

Another object is to provide improved processes for preparing luminescent screens.

Still another object is to provide luminescent screens which resist deterioration of the luminescence properties thereof due to thermal and chemical actions.

In general, the improved luminescent materials of the invention comprise finely-divided particles of a phosphor, especially a phosphor containing selenium, tellurium, and/or cadmium, coated with a thin layer of zinc sulfide. The zinc sulfide coating has unexpectedly been found to impart to the luminescent material unusual resistance to the deterioration of luminescence properties thereof during subsequent screen fabricating processes, especially during bake-out. The zinc sulfide coating thereby adapts the phosphor to conventional screen making processes as opposed to adapting the process to the luminescent material.

The coating is preferably prepared by suspending the phosphor particles in an aqueous medium and then precipitating zinc sulfide on the surface of the particles. The precipitation is preferably accomplished by dissolving a soluble zinc salt in an aqueous suspension of phosphor particles and then passing hydrogen sulfide therethrough, whereby zinc sulfide precipitates on the phosphor particles.

The improved luminescent screens of the invention comprise a layer of the coated phosphor particles herein upon a substrate. The luminescent screens herein are prepared by improved processes which comprise generally, first coating the phosphor particles with zinc sulfide, then adhering a layer of said coated particles with a binder upon a substrate and then baking said layer to remove said binder.

Figure 2:
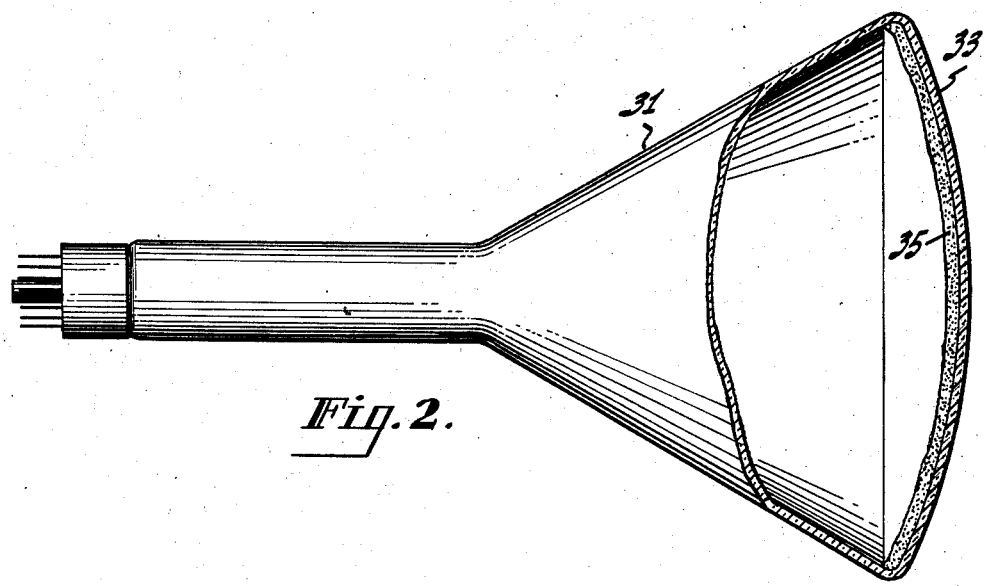

The invention is more fully described in the following detailed description and the accompanying drawing in which:

Figure 1 is a cross-sectional view of a typical zinc sulfide coated phosphor particle of the invention, and Figure 2 is a partially sectional view of a cathode ray tube including a luminescent screen of the invention.

*Example 1.*—Suspend 100 grams of zinc selenide phosphor, for example, a phosphor having the composition ZnSe:Cu(0.01), in about 100 cc. of water. (The figure in parentheses indicates parts by weight with respect to the weight of host crystal.) Bubble hydrogen sulfide gas through the suspension for about 1 to 2 minutes before adding slowly a solution containing 4 grams of zinc chloride in about 20 cc. of water over a period of about 10 minutes. Continue bubbling the hydrogen sulfide gas through the suspension while the zinc chloride solution is being added and for about 5 to 10 minutes after the zinc chloride addition is completed. Permit the solids to settle and decant the supernatant liquid. Then wash the solids by decantation and finally dry in an oven at about 150° C. The amount of zinc chloride theoreticaly provides about 2.8 weight percent of zinc sulfide with respect to the weight of phosphor. However, tests show that the coating on the phosphor comprises about 2 weight percent thereof.

Figure 1 shows a typical particle prepared according to Example 1. It comprises the phosphor particle 21 of copper-activated zinc selenide phosphor and a coating 23 thereon of precipitated zinc sulfide.

Other phosphors may be used in place of copper-activated zinc selenide of Example 1. For example, the host crystal for the phosphor may be zinc sulfo-selenide, zinc seleno-telluride, zinc-sulfo-seleno-telluride, zinc-cadmium selenide, zinc-cadmium sulfo-selenide, or zinc-cadmium sulfide. The activator therefor may be any of the usual activators such as silver or copper. Typical phosphors of this type are described in U.S. Patents 2,402,757; 2,402,759; 2,505,621; and 2,534,562.

The zinc sulfide coating may be prepared in any convenient way. It is preferred to prepare the coating by suspending the phosphor in an aqueous medium and precipitating zinc sulfide thereon. A specific example is shown in Example 1. Besides the zinc chloride disclosed in Example 1, any soluble zinc salt such as zinc sulfate, zinc acetate, or zinc nitrate, may be used. In addition to hydrogen sulfide, one may use any soluble sulfide which will precipitate zinc sulfide from an aqueous solution; for example, sodium sulfide, potassium sulfide, or ammonium sulfide. Organic sulfides such as methyl sulfides and ethyl sulfides may also be used since these hydrolyze in water giving available sulfide ions. The soluble zinc salt and the soluble sulfide may be added to the phosphor suspension in any desired order to precipitate the zinc sulfide.

It is preferred that the zinc sulfide coating should comprise 1 to 4 weight percent with respect to the weight of the phosphor. It has been found that as little as 0.1 weight percent of coating provides a detectable improvement on copper-activated zinc selenide phosphors. Coatings heavier than 4 percent may be used but the greater weights reduce the luminescence efficiency of the material by reducing the penetration of an electron beam, and by diluting the phosphor with an inert material.

The luminescent material herein may be used to prepare a luminescent viewing screen on the inner surface of a cathode ray tube. The phosphors may be used alone or in combination with other phosphors. The screens may be prepared by any well known process such as by dusting, settling, silk screening, or by photographic processing. The inside of the tube face may be coated with an organic material to provide a tacky binder. Common examples would be an aqueous solution of polyvinyl alcohol or a solution of ethyl cellulose in an organic solvent such as amyl alcohol. When the solvent has evaporated sufficiently so that a tacky coating is obtained, the tube envelope may be placed neck upward and the coated and dried phosphor powder prepared as hereinbefore described may be dusted evenly on the tacky surface. The layer of luminescent material, called a phosphor screen, is then dried and baked in air at about 425° C. to burn out or volatilize the organic binder. Referring to Figure 2, a cathode ray tube 31 has a faceplate 33 and a phosphor screen 35 deposited upon the inner surface of the faceplate 33 according to the above-described process.

The copper-activated zinc selenide phosphor of Example 1 may be used as a red-luminescing phosphor in color kinescopes. The phosphor may be deposited as dots or lines in the usual manner as by settling or flow-coating a slurry of the phosphor and a binder in an aqueous or organic solvent. Then a photographic process is used to remove the undesired areas of the coating, leaving the dot or line areas on the face of the kinescope. The applied phosphor is baked in air at about 425° C. to remove all of the volatile material.

The least amount of breakdown occurs when no organic material is present. For example, the uncoated phosphor of Example 1 alone may lose 30 to 50 percent of its efficiency when baked in air at about 425° C. When 5 to 10 weight percent of polyvinyl alcohol is added thereto as the binder, the loss in efficiency may be 75 to 90 percent under the same conditions of bake-out. By using the zinc sulfide coatings of the invention on the phosphor, the loss in efficiency under the same conditions of bake-out is reduced to about 10 percent when 5 to 10 weight percent of polyvinyl alcohol is used as the binder.

The Table shows some results of baking phosphor screens of ZnSe:Cu(0.007). Column II shows the relative peak energy of emission under cathode rays of the phosphor screens before bake-out and without any binder present. In column III, the relative efficiencies are shown when the screens were baked at 425° C. for one hour in the presence of a binder. The binder was a photosensitive mixture of polyvinyl alcohol and ammonium dichromate at about 5 and 0.2 weight percent respectively of the weight of the phosphor.

TABLE

*Relative luminescent efficiency of a zinc selenide phosphor after bake-out in air at 425° C.*

| I | II | III |
|---|---|---|
| Approximate weight and type of coating | Relative peak energy of emission before bake-out | Relative peak energy of emission after bake-out |
| Uncoated phosphor | [1] 100 | 15 |
| 2% zinc sulfide | 94 | 89 |
| 2% magnesium oxide | 86 | 16 |
| 2% calcium phosphate | 90 | 20 |

[1] Standard reference phosphor for measurement of luminescent efficiencies.

It may be noted that the zinc sulfide coating retains most of the luminescent efficiency, while common phosphor coatings, such as magnesium oxide or calcium phosphate, do not prevent breakdown of the zinc selenide phosphor during bake-out.

The success of the zinc sulfide coatings herein in reducing the deterioration of luminescence properties of the chalcogenide phosphors is believed to be due to the fact that the zinc sulfide of the coating is in the same chemical family as the host crystal and is therefore chemically similar. Thus, the coating may adhere by strong chemical bonds to the phosphor crystals thereby protecting the phosphor more effectively. During bake-out, the coating keeps moisture and air away from the phosphor crystals and thus the luminescence efficiency is retained.

*Example 2.*—Follow the procedure of Example 1 except that 7 grams of zinc sulfate are used in place of the zinc chloride. Following this procedure, a zinc sulfide coating comprising about 3½ percent by weight is formed on the phosphor particles.

*Example 3.*—Follow the procedure of Example 1 except that 2.5 grams of zinc acetate are used in place of the zinc chloride. A zinc sulfide coating comprising about 1 percent by weight is formed on the phosphor.

*Example 4.*—Follow the procedure of Example 1 except substitute a silver-activated zinc-cadmium sulfide phosphor such as ZnS(15)CdS(85):Ag(0.01) for the zinc selenide phosphor.

*Example 5.*—Follow the procedure of Example 2 except substitute copper-activated zinc-cadmium selenide phosphor, such as ZnSe(97)CdSe(3):Cu(0.007) for the zinc selenide phosphor.

*Example 6.*—Follow the procedure of Example 1 except substitute a silver-activated zinc sulfo-selenide phosphor, such as ZnS(80)ZnSe(20):Ag(0.01) for the zinc selenide phosphor.

*Example 7.*—Follow the procedure of Example 1 except substitute a copper-activated zinc-cadmium sulfide, such as ZnS(60)CdS(40):Cu(0.01) for the zinc selenide phosphor.

*Example 8.*—Follow the procedure of Example 1 except substitute a silver-activated zinc-cadmium sulfo-selenide, such as ZnSe(80)CdS(20):Ag(0.005) for the zinc selenide phosphor.

*Example 9.*—Follow the procedure of Example 1 except substitute a silver-activated zinc sulfo-telluride such as ZnS(95)ZnTe(5):Ag(0.015) for the zinc selenide phosphor.

*Example 10.*—Follow the procedure of Example 1 except substitute a copper-activated zinc seleno-telluride phosphor such as ZnSe(96)ZnTe(4):Cu(0.01) for the zinc selenide phosphor.

What is claimed is:

1. A luminescent material comprising finely-divided particles of a phosphor containing an element selected from the class consisting of selenium, tellurium, and cadmium, each particle having a thin coating of zinc sulfide thereon.

2. A luminescent material comprising finely-divided particles of a zinc selenide phosphor, each particle having a thin coating of zinc sulfide thereon.

3. A luminescent material comprising finely-divided particles of a copper-activated zinc selenide phosphor, each particle having a thin coating of zinc sulfide thereon, said zinc sulfide being present in the amount of about 1 to 4 weight percent of said phosphor.

4. In a method for preparing a luminescent screen including adhering finely-divided zinc selenide phosphor particles to a substrate with a binder and then baking said substrate to remove said binder, the preliminary step of coating each of said phosphor particles in an aqueous medium with a thin layer of zinc sulfide.

5. In a method for preparing a luminescent screen including adhering finely-divided zinc selenide phosphor particles to a substrate with a binder and then baking said substrate to remove said binder, the preliminary step of coating each of said phosphor particles in an aqueous medium with a thin layer of zinc sulfide, said zinc sulfide being present in an amount of about 2 to 4 weight percent of said phosphor.

6. A luminescent screen comprising a substrate having on at least a portion of the surface thereof, a layer of particles of a phosphor containing an element selected from the class consisting of selenium, tellurium, and cadmium, each particle having a thin coating of zinc sulfide thereon.

7. A luminescent screen comprising a substrate having on at least a portion of the surface thereof a layer of phosphor particles of zinc selenide, each particle having a thin coating of zinc sulfide thereon.

References Cited in the file of this patent

UNITED STATES PATENTS

| | | |
|---|---|---|
| 2,229,130 | Romano | Jan. 21, 1941 |
| 2,742,376 | Larach | Apr. 17, 1956 |
| 2,758,941 | Crosby et al. | Aug. 14, 1956 |